United States Patent
Chipchase et al.

(10) Patent No.: US 8,321,228 B2
(45) Date of Patent: Nov. 27, 2012

(54) AUDIO INTERFACE UNIT FOR SUPPORTING NETWORK SERVICES

(75) Inventors: Jan Chipchase, Los Angeles, CA (US); Pascal Wever, Los Angeles, CA (US); Nikolaj Bestle, Calabasas, CA (US); Pawena Thimaporn, Woodland Hills, CA (US); Thomas Ernst Arbisi, Camarillo, CA (US); John-Rhys Newman, Woodland Hills, CA (US); Andrew Julian Gartrell, Tarzana, CA (US); Simon David James, Simi Valley, CA (US)

(73) Assignee: Nokia Corporation, Espoo (FI)

( * ) Notice: Subject to any disclaimer, the term of this patent is extended or adjusted under 35 U.S.C. 154(b) by 602 days.

(21) Appl. No.: 12/548,337

(22) Filed: Aug. 26, 2009

(65) Prior Publication Data
US 2011/0054907 A1    Mar. 3, 2011

(51) Int. Cl.
*G10L 21/00* (2006.01)
(52) U.S. Cl. ............... 704/275; 704/270; 704/270.1; 704/272
(58) Field of Classification Search ............... 704/275, 704/270, 272, 270.1
See application file for complete search history.

(56) References Cited

U.S. PATENT DOCUMENTS

| 7,072,686 | B1 | 7/2006 | Schrager |
| 7,280,849 | B1 | 10/2007 | Bailey |
| 2004/0121796 | A1 | 6/2004 | Peng |
| 2005/0037818 | A1 | 2/2005 | Seshadri et al. |
| 2006/0045304 | A1 | 3/2006 | Lee et al. |
| 2007/0291953 | A1* | 12/2007 | Ngia et al. ............... 381/71.6 |
| 2007/0297618 | A1 | 12/2007 | Nurmi et al. |
| 2008/0194209 | A1 | 8/2008 | Haupt et al. |
| 2008/0298606 | A1* | 12/2008 | Johnson et al. ............... 381/74 |
| 2009/0046869 | A1* | 2/2009 | Griffin et al. ............... 381/74 |
| 2009/0141906 | A1 | 6/2009 | Truesdell |
| 2009/0209304 | A1* | 8/2009 | Ngia et al. ............... 455/575.2 |

FOREIGN PATENT DOCUMENTS
WO    WO 03/056790 A1    7/2003

* cited by examiner

*Primary Examiner* — Qi Han
(74) *Attorney, Agent, or Firm* — Ditthavong Mori & Steiner, P.C.

(57) ABSTRACT

Techniques for providing network services at an audio interface unit include determining, based on spoken sounds of a user of an apparatus received at a microphone of the apparatus, whether to present audio data received from a different apparatus. If it is determined to present the received audio data, then presentation of the received audio data at a speaker of the apparatus is initiated. In some embodiments, an apparatus includes a data communications bus; and logic encoded in one or more tangible media configured to performs the above steps. In some embodiments, the apparatus does not include a visual display and does not include a keypad of multiple buttons.

17 Claims, 11 Drawing Sheets

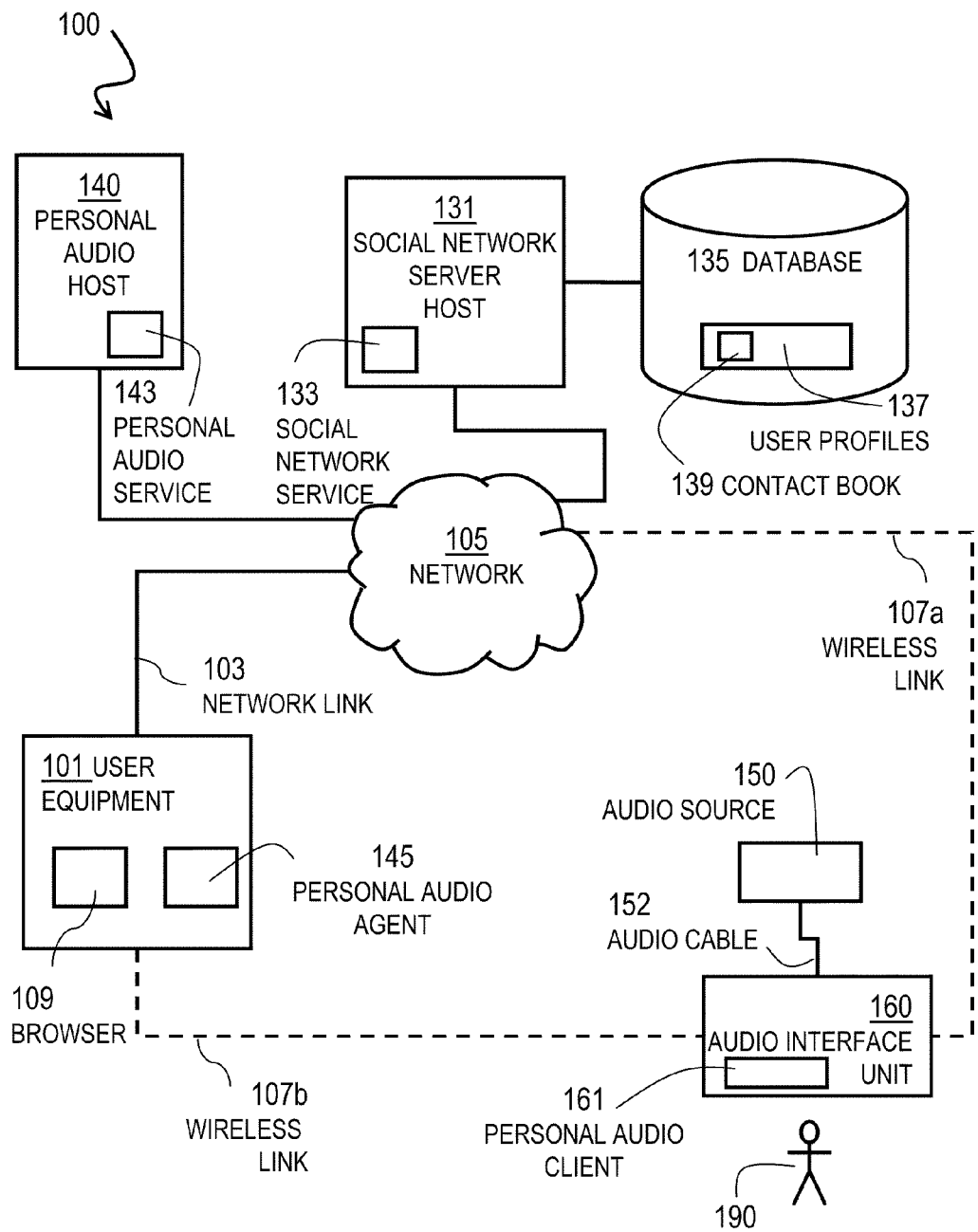

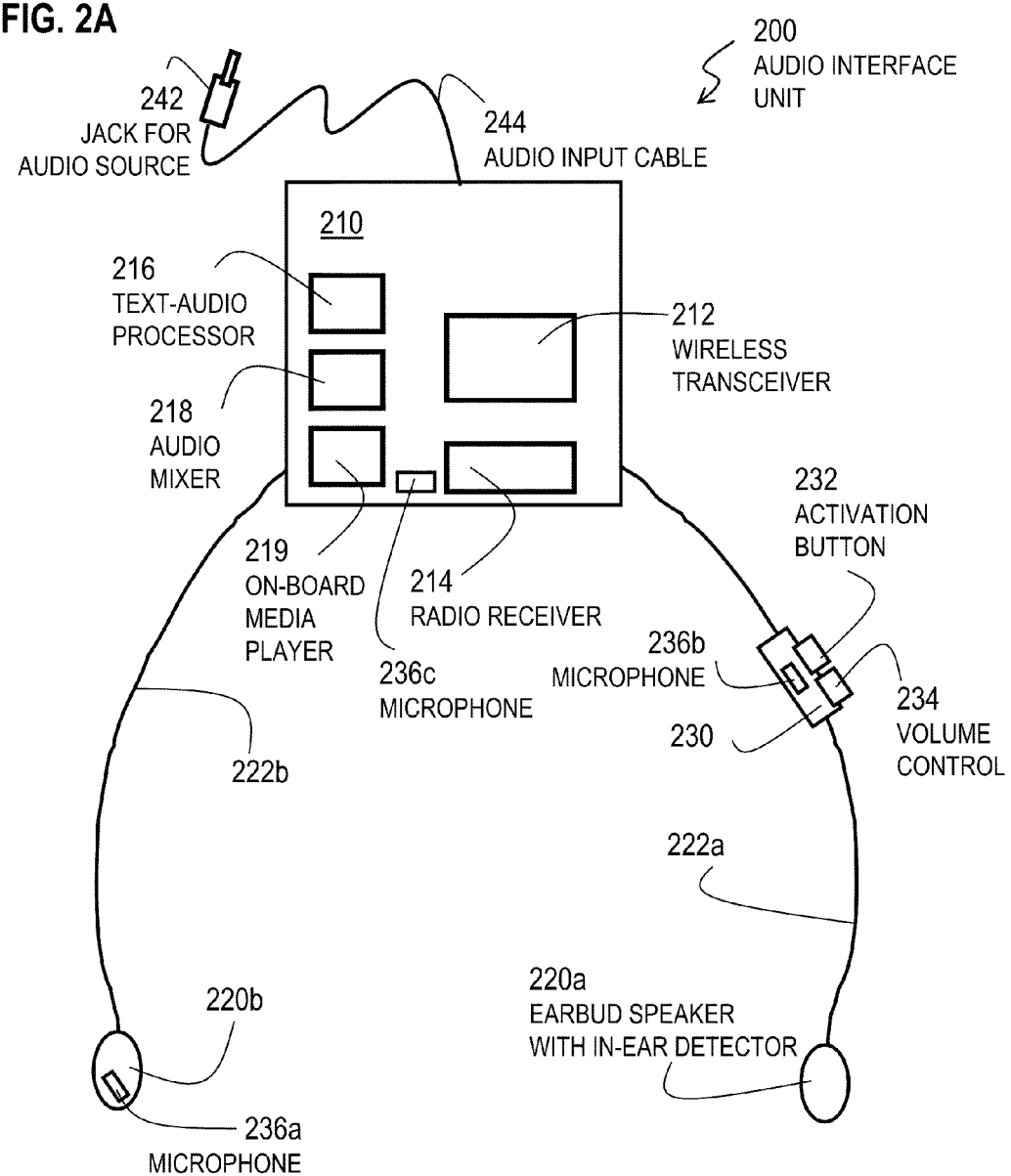

AUDIO INTERFACE UNIT FOR SUPPORTING NETWORK SERVICES

BACKGROUND

Wireless (e.g., cellular) service providers and device manufacturers are continually challenged to deliver value and convenience to consumers by, for example, providing compelling network services and devices. Most services involve the customer/user interacting with a device that has a visual display and a pad of multiple software or hardware keys to press, or both. By their nature, these devices require the user's eyes gaze on the device, at least for a short time, and one or more of the user's hands press the appropriate hard or soft keys. This can divert the user from other actions the user may be performing, such as operating equipment, driving, cooking, administering care to one or more persons, among thousands of other daily tasks.

SOME EXAMPLE EMBODIMENTS

Therefore, there is a need for an audio interface unit that is able to deliver many network services with little or no involvement of the user's eyes and hands.

According to one embodiment, an apparatus includes a data communications bus and logic encoded in one or more tangible media. The tangible media is configured to determine, based on spoken sounds of a user of the apparatus received at a microphone in communication with the logic through the data communications bus, whether to present audio data received from a different apparatus. The tangible media is further configured to initiate presentation of the received audio data at a speaker in communication with the tangible media through the data communications bus, if it is determined to present the received audio data.

According to one embodiment, a method comprises determining, based on spoken sounds of a user of an apparatus received at a microphone of the apparatus, whether to present audio data received from a different apparatus. If it is determined to present the received audio data, then initiating presentation of the received audio data at a speaker of the apparatus.

According to another embodiment, a computer-readable storage medium carrying one or more sequences of one or more instructions which, when executed by one or more processors, cause an apparatus to determine, based on spoken sounds of a user of an apparatus received at a microphone of the apparatus, whether to present audio data received from a different apparatus. The apparatus is also caused to initiate presentation of the received audio data at a speaker of the apparatus if it is determined to present the received audio data.

According to another embodiment, an apparatus comprises means for determining, based on spoken sounds of a user of an apparatus received at a microphone of the apparatus, whether to present audio data received from a different apparatus. The apparatus also comprises means for initiating presentation of the received audio data at a speaker of the apparatus if it is determined to present the received audio data.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of an example system capable of providing network services through an audio interface unit, according to one embodiment;

FIG. 2A is a diagram of the components of an example audio interface unit, according to one embodiment;

DESCRIPTION OF SOME EMBODIMENTS

Figure 2B:
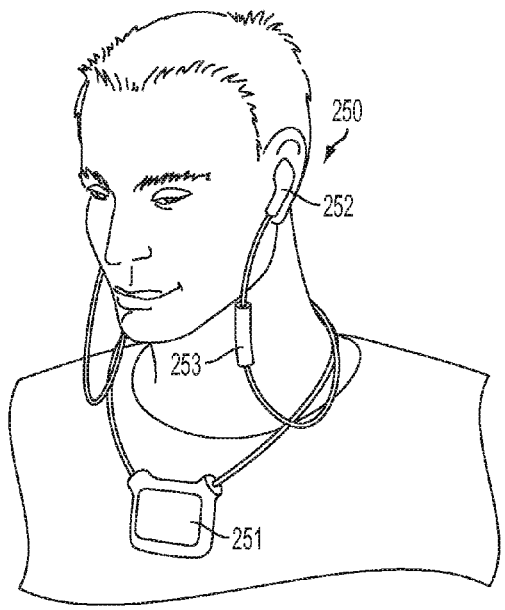
FIGS. 2B-2E are diagrams that depict various example form factors for an audio interface unit, according to various embodiments.

A method and apparatus for providing network services through an audio interface unit are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to an audio interface unit with a full cellular communications engine, it is contemplated that the approach described herein may be used with other wireless receivers and transceivers, including transceivers for Institute of Electrical & Electronics Engineers (IEEE) 802.11 standards for carrying out wireless local area network (WLAN) computer communication in the 2.4, 3.6 and 5 gigaHertz (GHz) frequency bands (1 GHz=$10^9$ cycles per second, also called Hertz), transceivers for IEEE 802.15 as a standardization of Bluetooth wireless specification for wireless personal area networks (WPAN), and receivers for radio signals, such as amplitude modulated (AM) signals and frequency modulated (FM) signals in various radio frequency bands, including broadcast radio bands, television audio bands, and satellite radio bands.

FIG. 1 is a diagram of an example system 100 capable of providing network services through an audio interface unit, according to one embodiment. A typical network device, such as a cell phone, personal digital assistant (PDA), or laptop, demands a user's eyes or hands or both, and diverts the user from other actions the user may be performing, such as operating equipment, driving, cooking, administering care to one or more persons, or walking, among thousands of other actions associated with even routine daily tasks.

To address this problem, system 100 of FIG. 1 introduces the capability for a user 190 to interact with a network without involving cables or diverting the user's eyes or hands from other tasks. Although user 190 is depicted for purposes of illustration, user 190 is not part of system 100. The system 100 allows the user 190 to wear an unobtrusive audio interface unit 160 and interact with one or more network services (e.g., social network service 133) through one or more wireless links (e.g., wireless link 107a, and wirelesses link 107b, collectively referenced hereinafter as wireless links 107), by listening to audio as output of the system and speaking as input to the system. Listening and speaking to receive and give information is not only natural and easy, but also is usually performed hands free and eyes free. Thus, the user can enjoy one or more network services while still productively and safely performing other daily tasks. Because the connection to the network is wireless, the user is unconstrained by cables while performing these other tasks. In embodiments in which the audio interface unit is simple, it can be manufactured inexpensively and can be made to be unobtrusive. An unobtrusive audio interface unit can be worn constantly by a user (e.g., tucked in clothing), so that the user 190 is continually available via the audio interface unit 160. This enables the easy delivery of a wide array of network services, as described in more detail below.

As shown in FIG. 1, the system 100 comprises an audio interface unit 160 and user equipment (UE) 101, both having connectivity to a personal audio host 140 and thence to a network service, such as social network service 133, via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

The audio interface unit 160 is a much trimmed down piece of user equipment with primarily audio input from, and audio output to, user 190. Example components of the audio interface unit 160 are described in more detail below with reference to FIG. 2A. It is also contemplated that the audio interface unit 160 comprises "wearable" circuitry. In the illustrated embodiments, a portable audio source 150, such as a portable Moving Picture Experts Group Audio Layer 3 (MP3) player, as a local audio source is connected by audio cable 152 to the audio interface unit 160.

By way of example, the UE 101 and audio interface unit 160 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Processes executing on various devices, such as audio interface unit 160 and personal audio host 140, often communicate using the client-server model of network communications. The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web (WWW) servers that provide web pages.

In the illustrated embodiment, the UE 101 includes a browser 109 for interacting with WWWW servers included in the social network service module 133 on one or more social network server hosts 131 and other service modules on other hosts. The illustrated embodiment includes a personal audio service module 143 on personal audio host 140. The personal audio service module 143 includes a Web server for interacting with browser 109 and also an audio server for interacting with a personal audio client 161 executing on the audio interface unit 160. The personal audio service 143 is configured to deliver audio data to the audio interface unit 160. In some embodiments, at least some of the audio data is based on data provided by other servers on the network, such as social network service 133. In the illustrated embodiment, the personal audio service 143 is configured for a particular user 190 by Web pages delivered to browser 109, for example to specify a particular audio interface unit 160 and what services are to be delivered as audio data to that unit. After configuration, user 190 input is received at personal audio service 143 from personal audio client 161 based on spoken words of user 190, and selected network services content is delivered from the personal audio service 143 to user 190 through audio data sent to personal audio client 161.

Many services are available to the user 190 of audio interface unit 160 through the personal audio service 143 via network 105, including social network service 133 on one or more social network server hosts 131. In the illustrated embodiment, the social network service 133 has access to database 135 that includes one or more data structures, such as user profiles data structure 137 that includes a contact book data structure 139. Information about each user who subscribes to the social network service 133 is stored in the user profiles data structure 137, and the telephone number, cell phone, number, email address or other network addresses, or some combination, of one or more persons whom the user contacts are stored in the contact book data structure 139.

In some embodiments, the audio interface unit 160 connects directly to network 105 via wireless link 107a (e.g., via a cellular telephone engine or a WLAN interface to a network access point). In some embodiments, the audio interface unit 160 connects to network 105 indirectly, through UE 101 (e.g., a cell phone or laptop computer) via wireless link 107b (e.g., a WPAN interface to a cell phone or laptop). Network link 103 may be a wired or wireless link, or some combination. In some embodiments in which audio interface unit relies on wireless link 107b, a personal audio agent process 145 executes on the UE 101 to transfer data packets between the audio interface unit 160 and the personal audio service 143, and to convert other data received at UE 101 to audio data for presentation to user 190 by personal audio client 161.

Although various hosts and processes and data structures are depicted in FIG. 1 and arranged in a particular way for purposes of illustration, in other embodiments, more or fewer hosts, processes and data structures are involved, or one or more of them, or portions thereof, are arranged in a different way.

FIG. 2A is a diagram of the components of an example audio interface unit 200, according to one embodiment. Audio interface unit 200 is a particular embodiment of the audio interface unit 160 depicted in FIG. 1. By way of example, the audio interface unit 200 includes one or more components for providing network services using audio input from and audio output to a user. It is contemplated that the functions of these components may be combined in one or more components, such as one or more chip sets depicted below and descried with reference to FIG. 9, or performed by other components of equivalent functionality. In some embodiments, one or more of these components, or portions thereof, are omitted, or one or more additional components are included, or some combination of these changes is made.

In the illustrated embodiment, the audio interface unit 200 includes circuitry housing 210, stereo headset cables 222a and 222b (collectively referenced hereinafter as stereo cables 222), stereo speakers 220a and 220b configured to be worn in the ear of the user with in-ear detector (collectively referenced hereinafter as stereo earbud speakers 220), controller 230, and audio input cable 244.

In the illustrated embodiment, the stereo earbuds 220 include in-ear detectors that can detect whether the earbuds are positioned within an ear of a user. Any in-ear detectors known in the art may be used, including detectors based on motion sensors, heart-pulse sensors, light sensors, or temperature sensors, or some combination, among others. In some embodiments the earbuds do not include in-ear detectors. In some embodiments, one or both earbuds 220 include a microphone, such as microphone 236a, to pick up spoken sounds from the user. In some embodiments, stereo cables 222 and earbuds 220 are replaced by a single cable and earbud for a monaural audio interface.

The controller 230 includes an activation button 232 and a volume control element 234. In some embodiments, the controller 230 includes a microphone 236b instead of or in addition to the microphone 236a in one or more earbuds 220 or microphone 236c in circuitry housing 210. In some embodiments, the controller 230 is integrated with the circuitry housing 210.

The activation button 232 is depressed by the user when the user wants sounds made by the user to be processed by the audio interface unit 200. Depressing the activation button to speak is effectively the same as turning the microphone on, wherever the microphone is located. In some embodiments, the button is depressed for the entire time the user wants the user's sounds to be processed; and is released when processing of those sounds is to cease. In some embodiments, the activation button 232 is depressed once to activate the microphone and a second time to turn it off. Some audio feedback is used in some of these embodiments to allow the user to know which action resulted from depressing the activation button 232.

In some embodiment with an in-ear detector and a microphone 236a in the earbud 220b, the activation button 232 is omitted and the microphone is activated when the earbud is out and the sound level at the microphone 236a in the earbud 220b is above some threshold that is easily obtained when held to the user's lips while the user is speaking and which rules out background noise in the vicinity of the user.

An advantage of having the user depress the activation button 232 or take the earbud with microphone 236a out and hold that earbud near the user's mouth is that persons in sight of the user are notified that the user is busy speaking and, thus, is not to be disturbed.

In some embodiments, the user does not need to depress the activation button 232 or hold an earbud with microphone 236a; instead the microphone is always active but ignores all sounds until the user speaks a particular word or phrase, such as "Mike On," that indicates the following sounds are to be processed by the unit 200, and speaks a different word or phrase, such as "Mike Off," that indicates the following sounds are not to be processed by the unit 200." Some audio feed back is available to determine if the microphone is being processed or not, such as responding to a spoken word or phrase, such as "Mike," with the current state "Mike on" or "Mike off." An advantage of the spoken activation of the microphone is that the unit 200 can be operated completely hands-free so as not to interfere with any other task the user might be performing.

In some embodiments, the activation button doubles as a power-on/power-off switch, e.g., as indicated by a single depression to turn the unit on when the unit is off and by a quick succession of multiple depressions to turn off a unit that is on. In some embodiments, a separate power-on/power-off button (not shown) is included, e.g., on circuitry housing 210.

The volume control 234 is a toggle button or wheel used to increase or decrease the volume of sound in the earbuds 220. Any volume control known in the art may be used. In some embodiments the volume is controlled by the spoken word, while the sounds from the microphone are being processed, such as "Volume up" and "Volume down" and the volume control 234 is omitted. However, since volume of earbud speakers is changed infrequently, using a volume control 234 on occasion usually does not interfere with hands-free operation while performing another task.

The circuitry housing 210 includes wireless transceiver 212, a radio receiver 214, a text-audio processor 216, an audio mixer module 218, and an on-board media player 219. In some embodiments, the circuitry housing 210 includes a microphone 236c.

The wireless transceiver 212 is any combined electromagnetic (em) wave transmitter and receiver known in the art that can be used to communicate with a network, such as network 105. An example transceiver includes multiple components of the mobile terminal depicted in FIG. 10 and described in more detail below with reference to that figure. In some embodiments, the audio interface unit 160 is passive when in wireless mode, and only a wireless receiver is included.

In some embodiments, wireless transceiver 212 is a full cellular engine as used to communicate with cellular base stations miles away. In some embodiments, wireless transceiver 212 is a WLAN interface for communicating with a network access point (e.g., "hot spot") hundreds of feet away. In some embodiments, wireless transceiver 212 is a WPAN interface for communicating with a network device, such as a cell phone or laptop computer, with a relatively short distance (e.g., a few feet away). In some embodiments, the wireless transceiver 212 includes multiple transceivers, such as several of those transceivers described above.

In the illustrated embodiment, the audio interface unit includes several components for providing audio content to be played in earbuds 220, including radio receiver 214, on-board media player 219, and audio input cable 244. The radio receiver 214 provides audio content from broadcast radio or television or police band or other bands, alone or in some combination. On-board media player 219, such as a player for data formatted according to Moving Picture Experts Group Audio Layer 3 (MP3), provides audio from data files stored in memory (such as memory 905 on chipset 900 described below with reference to FIG. 9). These data files may be acquired from a remote source through a WPAN or WLAN or cellular interface in wireless transceiver 212. Audio input cable 244 includes audio jack 242 that can be connected to a local audio source, such as a separate local MP3 player. In such embodiments, the audio interface unit 200 is essentially a multi-functional headset for listening to the local audio source along with other functions. In some embodiments, the audio input cable 244 is omitted.

In the illustrated embodiment, the circuitry housing 210 includes a text-audio processor 216 for converting text to audio (speech) or audio to text or both. Thus content delivered as text, such as via wireless transceiver 212, can be converted to audio for playing through earbuds 220. Similarly, the user's spoken words received from one or more microphones 236a, 236b, 236c (collectively referenced hereinafter as microphones 236) can be converted to text for transmission through wireless transceiver 212 to a network service. In some embodiments, the text-audio processor 216 is omitted and text-audio conversion is performed at a remote device and only audio data is exchanged through wireless transceiver 212. In some embodiments, the text-audio processor 216 is simplified for converting only a few key commands from speech to text or text to speech or both. By using a limited set of key commands of distinctly different sounds, a simple text-audio processor 216 can perform quickly with few errors and little power consumption.

In the illustrated embodiment, the circuitry housing 210 includes an audio mixer module 218, implemented in hardware or software, for directing audio from one or more sources to one or more earbuds 220. For example, in some embodiments, left and right stereo content are delivered to different earbuds when both are determined to be in the user's ears. However, if only one earbud is in an ear of the user, both left and right stereo content are delivered to the one earbud that is in the user's ear. Similarly, in some embodiments, when audio data is received through wireless transceiver 212 while local content is being played, the audio mixer module 218 causes the local content is interrupted and the audio data from the wireless transceiver is played instead. In some embodiments, if both earbuds are in place in the user's ears, the local content is mixed into one earbud and the audio data from the wireless transceiver 212 is output to the other earbud. In some embodiments, the selection to interrupt or mix the audio sources is based on spoken words of the user or preferences set when the audio interface unit is configured, as described in more detail below.

Figure 2C:
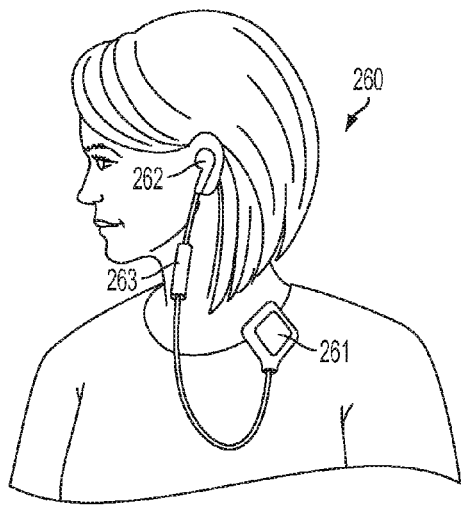
Figure 2D:
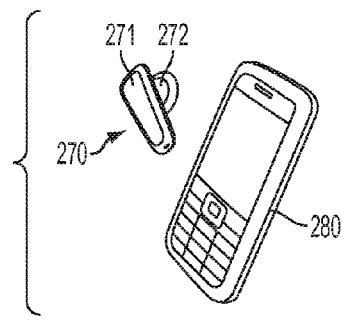
Figure 2E:
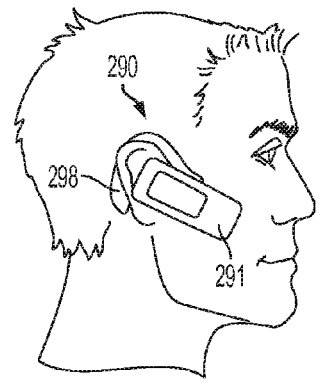

FIGS. 2B-2E are diagrams that depict various example form factors for an audio interface unit 160, according to various embodiments. FIG. 2B depicts an audio interface unit 250 that includes circuitry housing 251, two earbuds 252 and a controller 253. The circuitry housing 251 hangs unobtrusively around the user's neck. The controller 253 hangs near the user's mouth to pick up spoken words. FIG. 2C depicts an audio interface unit 260 that includes circuitry housing 261, one earbud 262 and a controller 263. The circuitry housing 261 clips unobtrusively to the user's clothing. The controller 263 hangs near the user's mouth to pick up spoken words. FIG. 2D depicts an audio interface unit 270 that includes circuitry housing 271, one earbud 272 without a separate controller. The circuitry housing 271 rides earbud 272 at a user's ear. The audio interface unit 270 communicates wirelessly with a nearby cell phone 280, e.g., using Bluetooth communication protocol, rather than directly to the network 105. FIG. 2E depicts an audio interface unit 290 that includes circuitry housing 291, one earbud not shown without a separate controller. The circuitry housing 291 is larger than housing 271 and thus rides on an ear hanger 298 at a user's ear. The larger audio interface unit 290 communicates with a cellular base station using cellular telephone protocols. In some embodiments, the ear hanger 298 acts as a controller 230.

Figure 3:
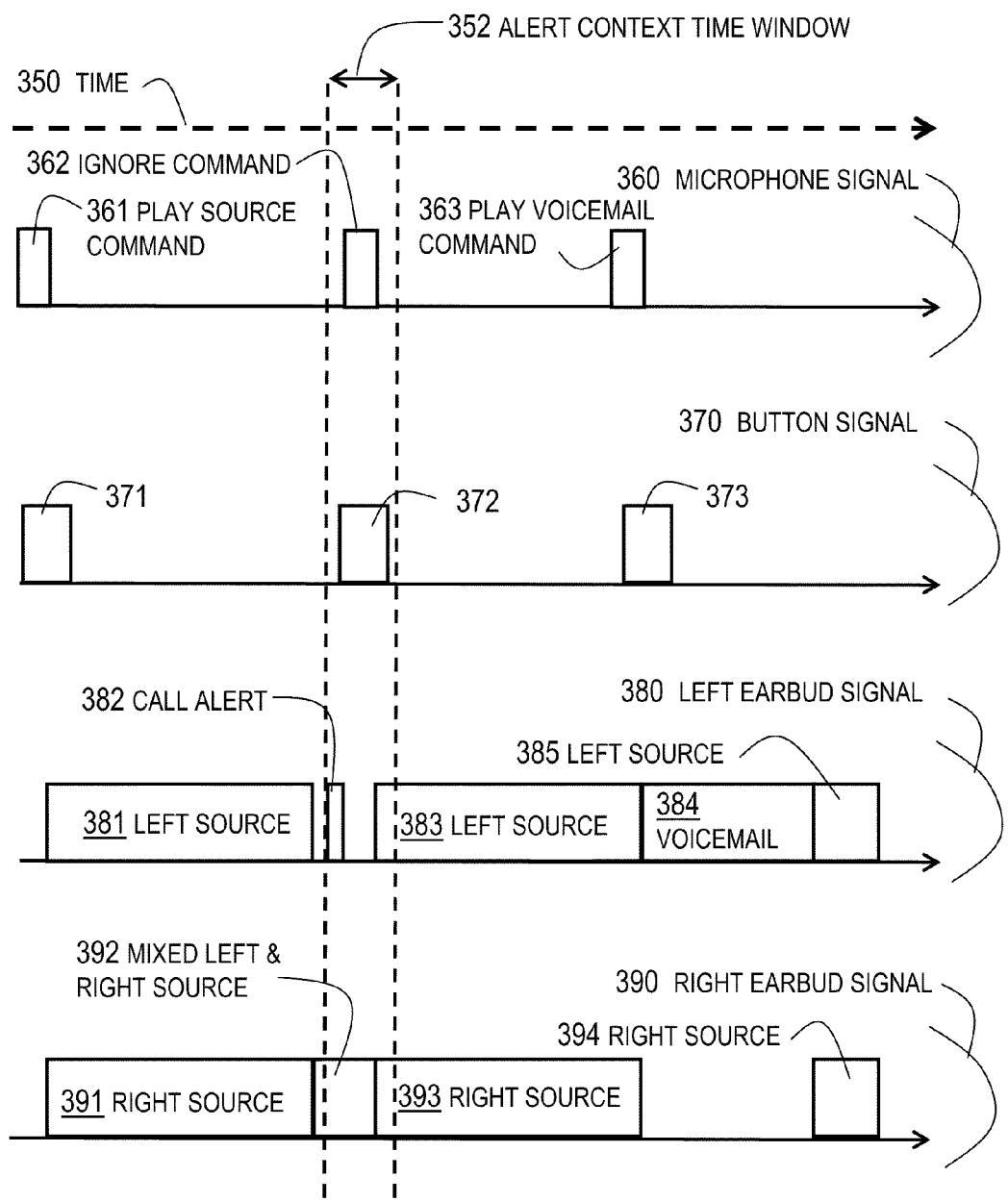
FIG. 3 is a time sequence diagram that illustrates example input and audio output signals at an audio interface unit, according to an embodiment.

FIG. 3 is a time sequence diagram that illustrates example input and audio output signals at an audio interface unit, according to an embodiment. Specifically, FIG. 3 represents an example user experience for a user of the audio interface unit 160. Time increases to the right for an example time interval as indicated by dashed arrow 350. Contemporaneous signals at various components of the audio interface unit are displaced vertically and represented on four time lines depicted as four corresponding solid arrows below arrow 350. An asserted signal is represented by a rectangle above the corresponding time line; the position and length of the rectangle indicates the time and duration, respectively, of an asserted signal. Depicted are microphone signal 360, activation button signal 370, left earbud signal 380, and right earbud signal 390.

For purposes of illustration, it is assumed that the microphone is activated by depressing the activation button 232 while the unit is to process the incoming sounds; and the activation button is released when sounds picked up by the microphone are not to be processed. It is further assumed for purposes of illustration that both earbuds are in place in the corresponding ears of the user. It is further assumed for purposes of illustration that the user had previously subscribed, using browser 109 on UE 101 to interact with the personal audio service 143, for telephone call forwarding to the audio interface unit 160 and internet newsfeed to the unit 160.

At the beginning of the interval, the microphone is activated as indicated by the button signal portion 371, and the user speaks a command picked up as microphone signal portion 361 that indicates to play an audio source, e.g., "play FM radio," or "play local source," or "play stored track X" (where X is a number or name identifier for the local audio file of interest), or "play internet newsfeed." For purposes of illustration, it is assumed that the user has asked to play a stereo source, such as stored track X.

In response to the spoken command in microphone signal 361, the audio interface unit 160 outputs the stereo source to the two earbuds as left earbud signal 381 and right earbud signal 391 that cause left and right earbuds to play left source and right source respectively.

When a telephone call is received (e.g., is forwarded from a cell phone or land line to the personal audio service 143) for the user, an alert sound is issued at the audio interface unit 160, e.g., as left earbud signal portion 382 indicating a telephone call alert. For example, in various embodiments, the personal audio service 143 receives the call and encodes an alert sound in one or more data packets and sends the data packets to personal audio client 161 through wireless link 107a or indirectly through personal audio agent 145 over wireless link 107b. The client 161 causes the alert to be mixed in to the left or right earbud signals, or both. In some embodiments, personal audio service 143 just sends data indicating an incoming call; and the personal audio client 161 causes the audio interface unit 160 to generate the alert sound internally as call alert signal portion 382. In some embodiments, the stereo source is interrupted by the audio mixer module 218 so that the alert signal portion 382 can be easily noticed by the user. In the illustrated embodiment, the audio mixer module 218 is configured to mix the left and right source and continued to present them in the right earbud as right earbud signal portion 392, while the call alert signal in left earbud signal portion 382 is presented alone to the left earbud. This way, the user's enjoyment of the stereo source is less interrupted, in case the user prefers the source to the telephone call.

The call alert left ear signal portion 382 initiates an alert context time window indicated by time interval 352 in which microphone signals (or activation button signals) are interpreted in the context of the call alert. Only sounds that are associated with actions appropriate for responding to a call alert are tested for by the audio-text processor 216 or the remote personal audio service 143, such as "answer," "ignore," "identify." Having this limited context-sensitive vocabulary greatly simplifies the processing, thus reducing computational resource demands on the audio interface unit 200 or remote host 140, or both, and reducing error rates. In some embodiments, only two response are appropriate (e.g., "answer," or "ignore"), and the activation button signal can be used, without the microphone signal, to represent one of the responses (e.g., "answer").

In the illustrated embodiment, the user responds by activating the microphone as indicated by activation button signal portion 372 and speaks a command to ignore the call, represented as microphone signal portion 362 indicating an ignore command. As a result, the call is not put through to the audio interface unit 160. It is assumed for purposes of illustration that the caller leaves a message with the user's voice mail system. Also as a result of the ignore command, the response to the call alert is concluded and the left and right sources for the stereo source are returned to the corresponding earbuds, as left earbud signal portion 383 and right earbud signal portion 393, respectively.

At a later time, the user decides to listen to the user's voicemail. The user activates the microphone as indicated by activation button signal portion 373 and speaks a command to play voicemail, represented as microphone signal portion 363 indicating a play voicemail command. As a result, audio data representing the user's voicemail is forwarded to the audio interface unit. In some embodiments, the text-audio processor 216 interprets the microphone signal portion 363 as the play voicemail command and sends a message to the personal audio service 143 to provide the voicemail data. In other embodiments, the microphone signal portion 363 is simply encoded as data, placed in one or more data packets, and forwarded to the personal audio service 143 that does the interpretation.

In either case, audio data is received from the voicemail system through the personal audio service 143 at the personal audio client 161 as data packets of encoded audio data, as a result of the microphone signal portion 363 indicating the play voicemail command spoken by the user. The audio mixer module 218 causes the audio represented by the audio data to be presented in one or more earbuds. In the illustrated embodiment, the voicemail audio signal is presented as left earbud signal portion 384 indicating the voicemail audio and the right earbud signal is interrupted. In some embodiments, the stereo source is paused (i.e., time shifted) until the voicemail audio is completed. In some embodiments, the stereo source that would have been played in this interval is simply lost.

When the voicemail signal is complete, the audio mixer module 218 restarts the left and right sources of the stereo source as left earbud signal portion 385 and right earbud signal portion 394, respectively.

Thus, as depicted in FIG. 3, a variety of network services, such as media playing, internet newsfeeds, telephone calls and voicemail are delivered to a user through the unobtrusive, frequently worn, audio interface unit 200. In other embodiments, other alerts and audio sources are involved. Other audio sources include internet newsfeeds (including sports or entertainment news), web content (often converted from text to speech), streaming audio, broadcast radio, and custom audio channels designed by one or more users, among others. Other alerts include breaking news alerts, text and voice message arrival, social network status change, and user-set alarms and appointment reminders, among others.

Figure 8:
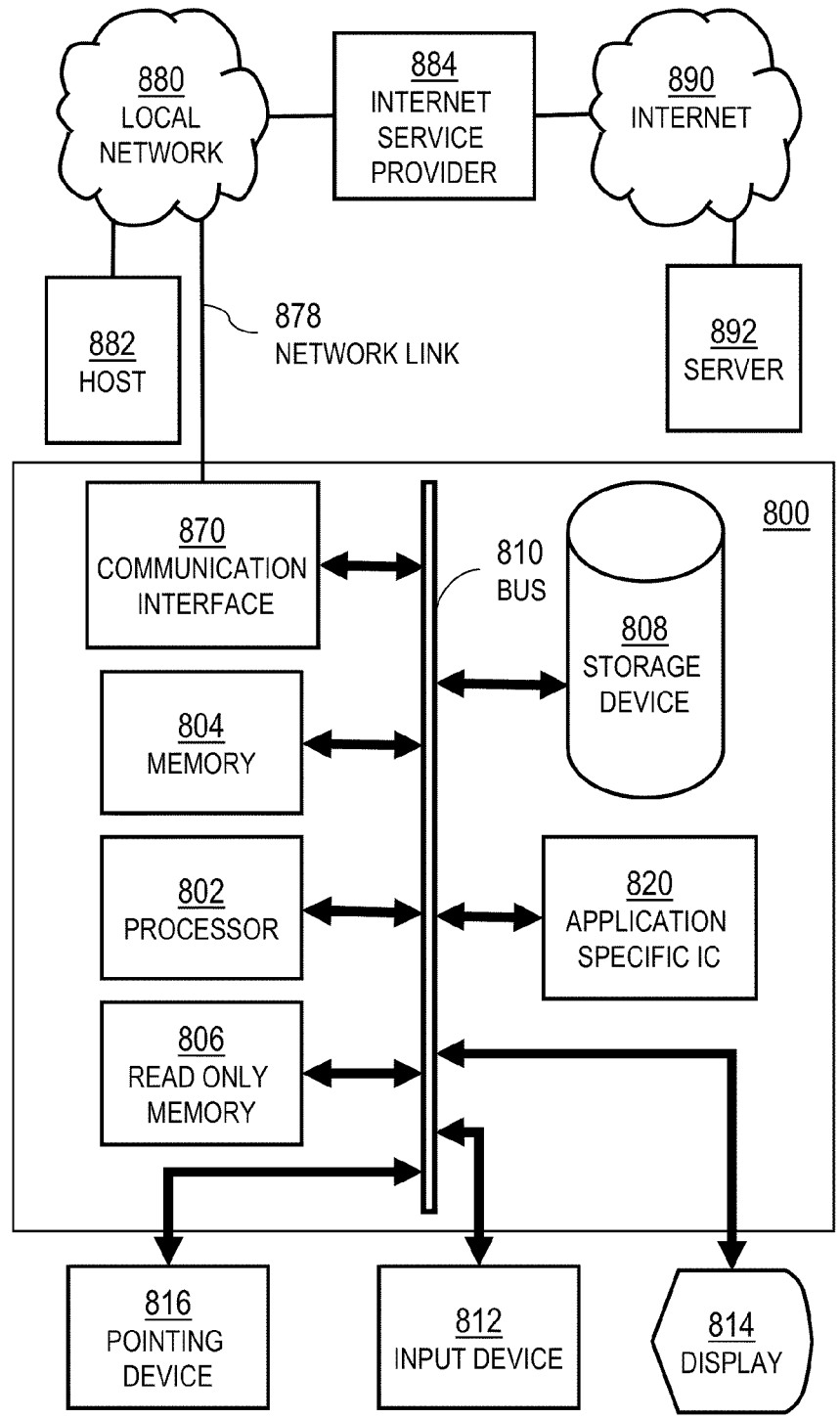
FIG. 8 is a diagram of hardware that can be used to implement an embodiment of the invention.
Figure 9:
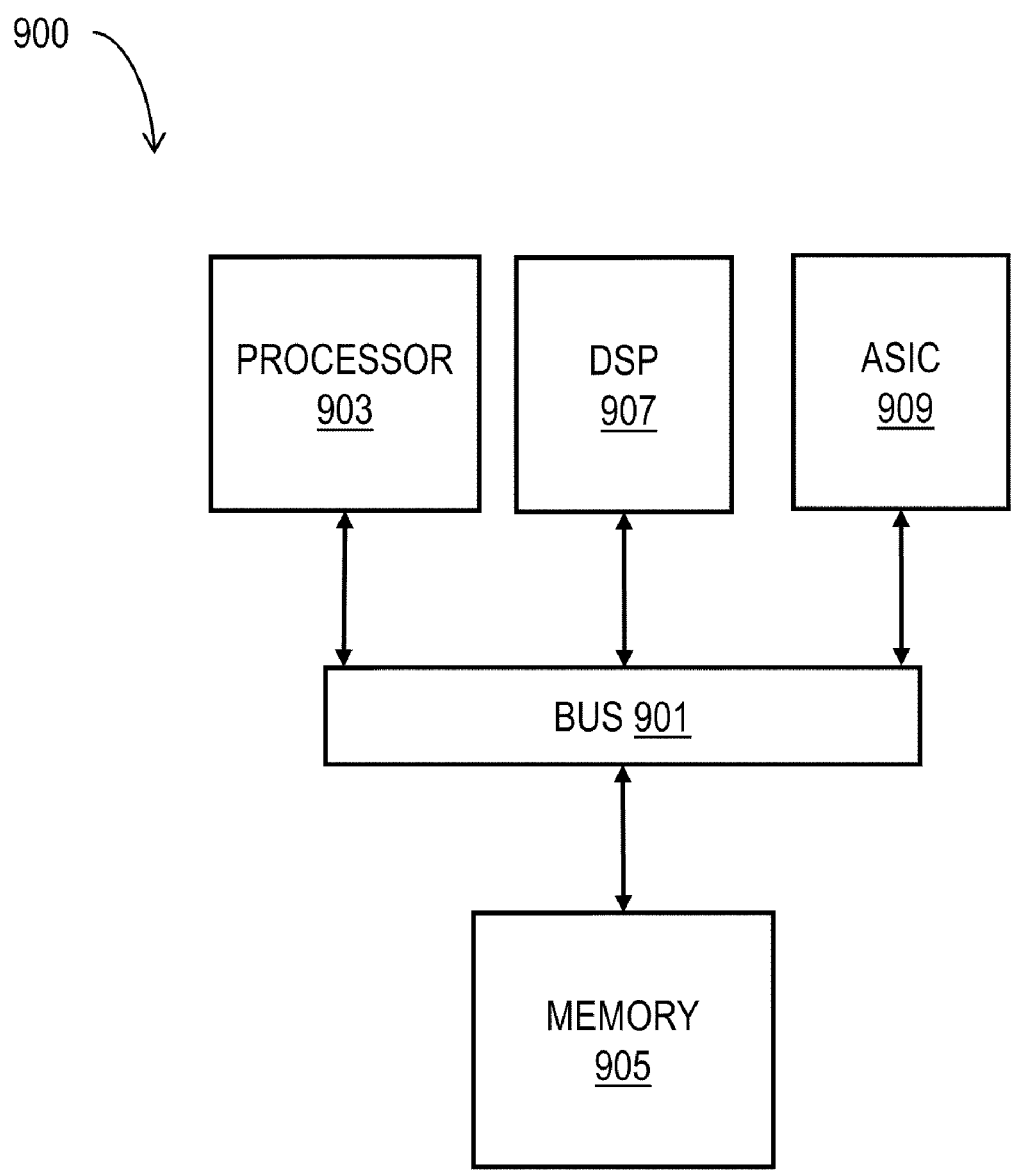
FIG. 9 is a diagram of a chip set that can be used to implement an embodiment of the invention.

In some embodiments, the audio interface unit includes a data communications bus, such as bus 901 of chipset 900 as depicted in FIG. 9, and a processor, such as processor 903 in chipset 900, or other logic encoded in tangible media as described with reference to FIG. 8. The tangible media is configured either in hardware or with software instructions in memory, such as memory 905 on chipset 900, to determine, based on spoken sounds of a user of the apparatus received at a microphone in communication with the tangible media through the data communications bus, whether to present audio data received from a different apparatus. The processor is also configured to initiate presentation of the received audio data at a speaker in communication with the tangible media through the data communications bus, if it is determined to present the received audio data.

Figure 4:
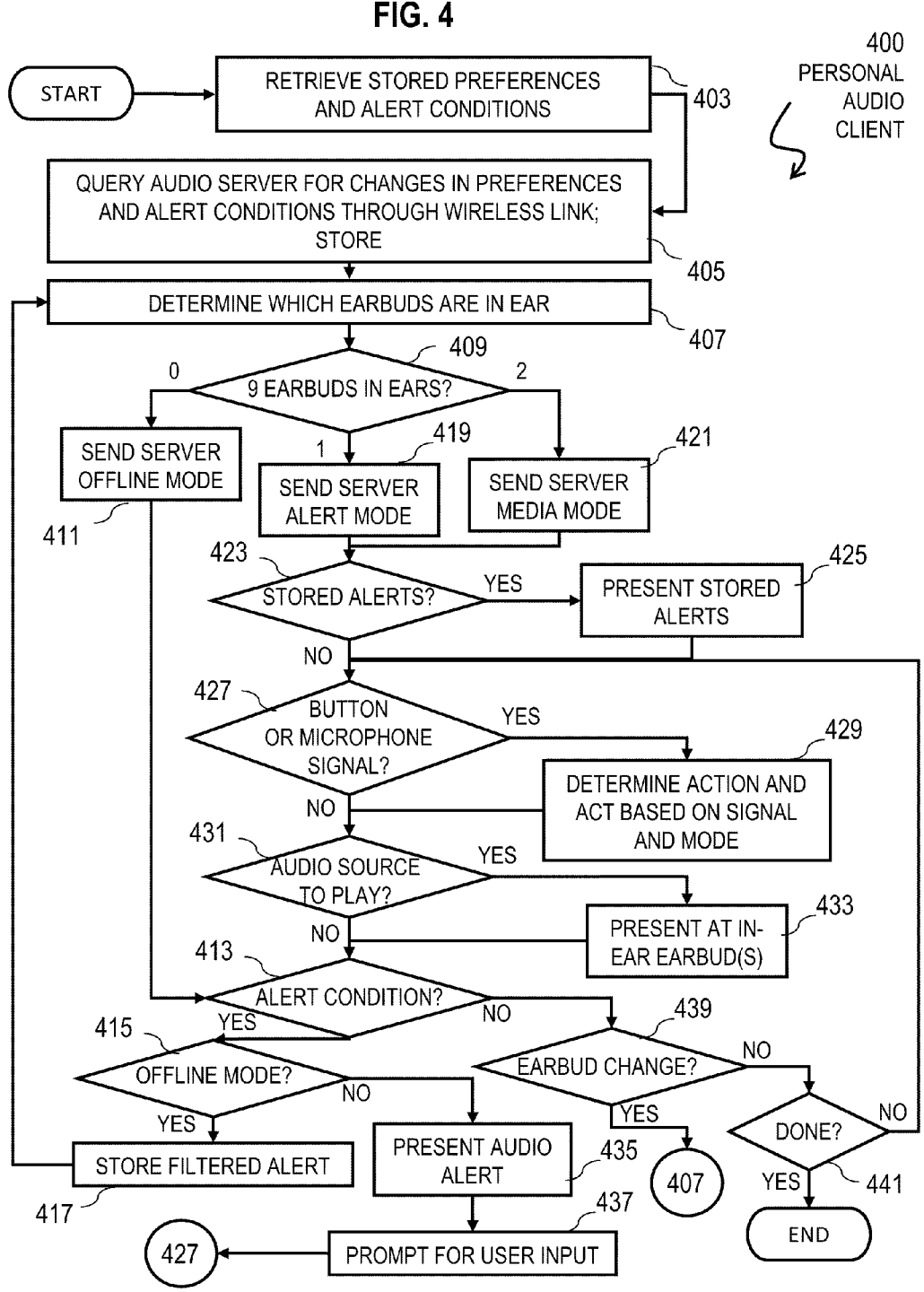
FIG. 4 is a flowchart of an example process for providing network services at an audio interface unit, according to one embodiment.
Figure 5:
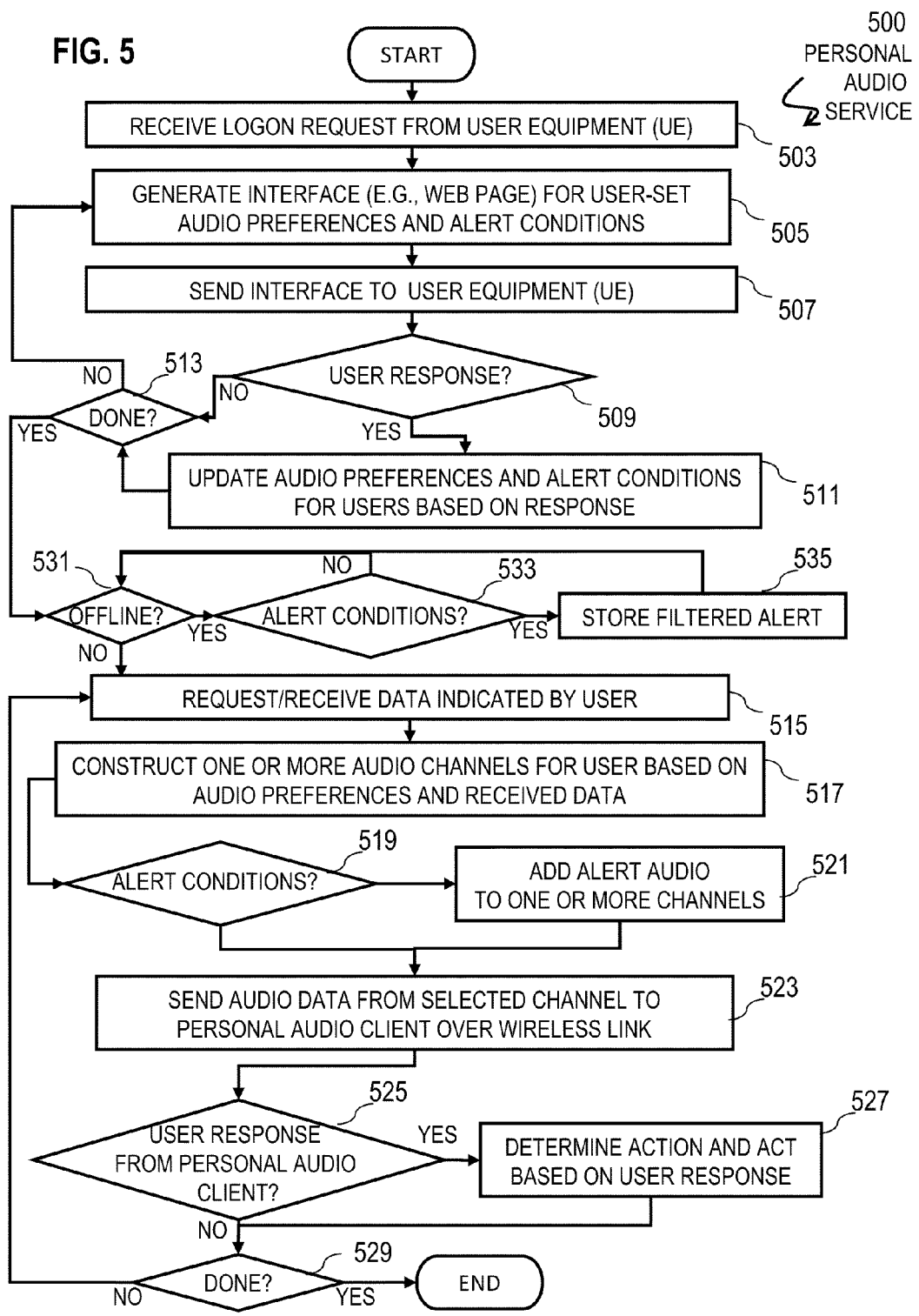
FIG. 5 is a flowchart of an example process for providing network services at a personal audio service, according to one embodiment.
Figure 7:
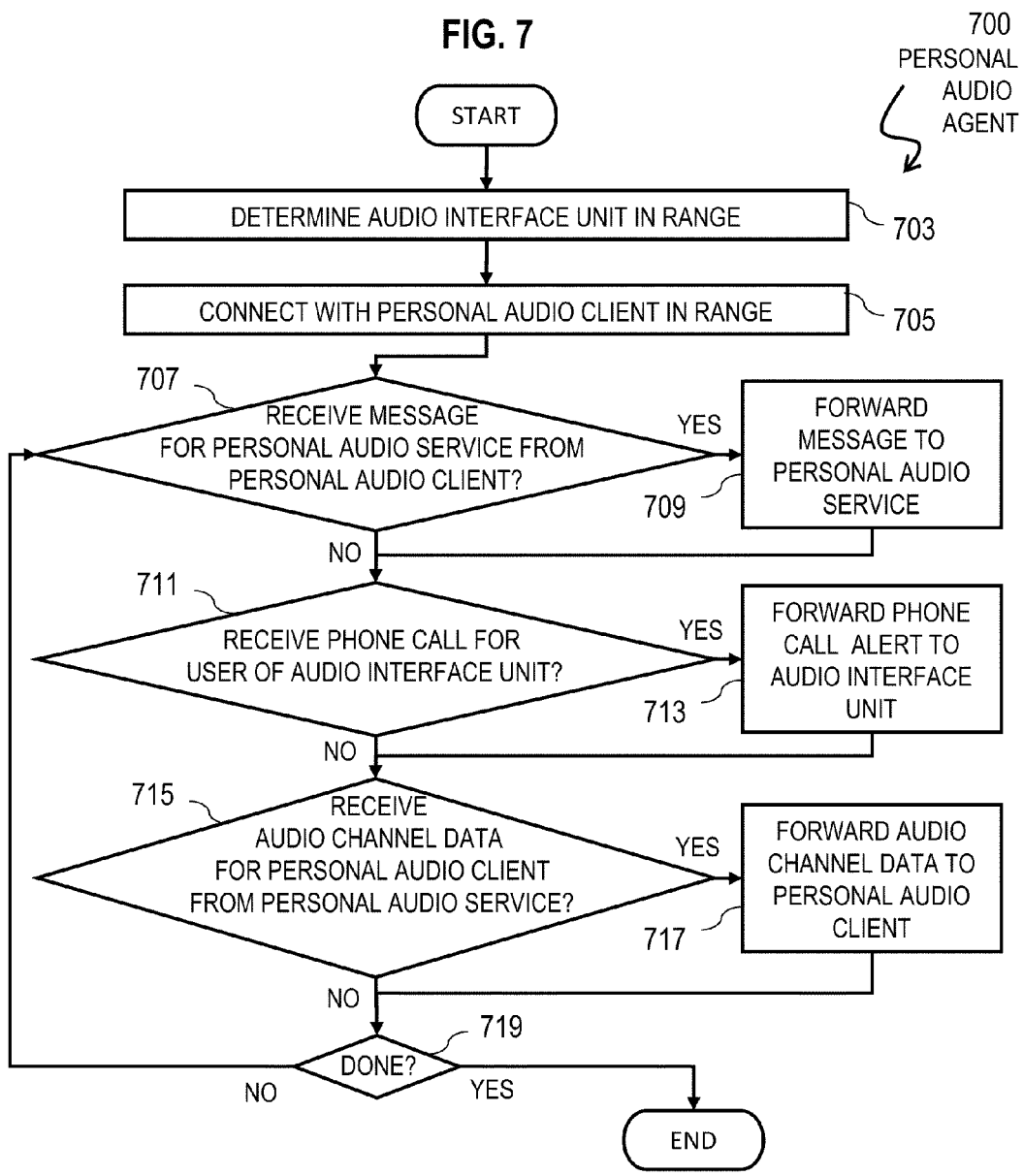
FIG. 7 is a flowchart of an example process for providing network services at a personal audio agent in communication between a personal audio service and an audio interface unit, according to one embodiment.

FIG. 4 is a flowchart of an example process 400 for providing network services at an audio interface unit, according to one embodiment. In one embodiment, the personal audio client 161 on the audio interface unit 160 performs the process 400 and is implemented in, for instance, a chip set including a processor and a memory as shown FIG. 9 or logic encoded in tangible media. In some embodiments, the steps of FIG. 4 are represented as a state machine and implemented in whole or in part in hardware. Although steps in FIG. 4 and subsequent flow charts FIG. 5 and FIG. 7 are shown in a particular order for purposes of illustration, in other embodiments, one or more steps may be performed in a different order or overlapping in time, in series or in parallel, or one or more steps may be omitted or added, or changed in some combination of ways.

In step 403, stored preferences and alert conditions are retrieved from persistent memory on the audio interface unit 160. Preferences include values for parameters that describe optional functionality for the unit 160, such as how to mix different simultaneous audio sources, which earbud to use for alerts when both are available, how to respond to one or more earbuds not in an ear, what words to use for different actions, what words to use in different alert contexts, what network address to use for the personal audio service 143, names for different audio sources, names for different contacts. Parameters for alert conditions indicate what sounds to use for breaking news, social network contact status changes, text message, phone calls, voice messages, reminders, and different priorities for different alerts. In some embodiments, the audio interface unit 160 does not include persistent memory for these preferences and step 403 is omitted.

In step 405, a query message is sent to the personal audio service 143 for changes in preferences and alert conditions. In some embodiments, the audio interface unit 160 does not include persistent memory for these preferences and step 405 includes obtaining all current values for preferences and alert conditions.

In step 407, it is determined which earbuds are in place in the user's ears. For example, in-ear detectors are interrogated to determine if each earbud is in place in a user's ear.

In step 409 a branch point is reached based on the number of earbuds detected to be in place in a user's ear. If no earbud is in place in the user's ear, then the audio interface unit is in offline mode, and a message is sent to the personal audio service 143 that the particular audio interface unit 160 is in offline mode.

In step 413, it is determined if an alert conditions is satisfied, e.g., a breaking news alert is received at the audio interface unit 160. If so, then in step 415 it is determined whether the audio interface unit is in offline mode. If so, then in step 417 instead of presenting the alert at an earbud, the alert is filtered and, if the alert passes the filter, the filtered alert is stored. The stored alerts are presented to the user when the user next inserts an earbud, as describe below with reference to step 425. Alerts are filtered to remove alerts that are not meaningfully presented later, such as an alert that it is 5 PM or an alert that a particular expected event or broadcast program is starting. Control then passes back to step 407 to determine which earbuds are currently in an ear of the user. In some embodiments, alerts and other audio content are determined by the remote personal audio service 143; and step 413, step 415 and step 417 are omitted.

If it is determined in step 409 that one earbud is in place in the user's ear, then the audio interface unit is in alert mode, capable of receiving alerts; and a message is sent to the personal audio service 143 that the particular audio interface 160 unit is in alert mode.

If it is determined in step 409 that two earbuds are in place in the user's ears, then the audio interface unit is in media mode, capable of listening to stereo media or both media and alerts simultaneously; and a message is sent to the personal audio service 143 that the particular audio interface 160 unit is in media mode.

In step 423, it is determined whether there are stored alerts. If so, then in step 425 the stored alerts are presented in one or more earbuds in place in the user's ear. In some embodiments, alerts and other audio content are determined by the remote personal audio service 143; and step 423 and step 425 are omitted.

In step 427, it is determined whether there is an activation button or microphone signal or both. If so, then in step 429 an action to take is determined and the action is performed based on the signal and the alert or media mode of the audio interface unit. For example, a particular audio source is played, or a particular alert is responded to based on the spoken word of the user, or a phone call to a particular contact is initiated. In some embodiments, the action is determined at the text-audio processor 216, or performed by the audio interface unit 160, or both. In some embodiments the button or microphone signal is transmitted to the personal audio service 143, and the action is determined and performed there. In some embodiments the action is determined at the text-audio processor 216; and that action is indicated in data sent to the personal audio service 143, where the action is performed.

In step 431, it is determined whether there is an audio source to play, such as broadcast radio program, a local audio source, a stream of data packets with audio codec, e.g., from a news feed, or text to speech conversion of web page content. If so, then in step 433, the audio source is presented at one or more in-ear earbuds by the audio mixer module 218.

In step 413, as described above, it is determined whether alert conditions are satisfied, e.g., whether an alert is received from the personal audio service 143. If so, and if the audio interface unit 160 is not in offline mode as determined in step 415, then in step 435 an audio alert is presented in one or more in-ear earbuds. For example the audio mixer module 218 interrupts the audio source to present the alert in one or both in-ear earbuds. In step 437, the user is prompted for input in response for the alert; and the alert context time window is initiated. Control passes to step 427 to process any user spoken response to the alert, e.g., received as microphone and activation button signals. In some embodiments, the prompts include an audio invitation to say one or more of the limited vocabulary commands associated with the alert. In some embodiments, the user is assumed to know the limited vocabulary responses, and step 437 is omitted.

In some embodiments, the alerts (and any prompts) are included in the audio data received from the remote personal audio service 143 through the wireless transceiver 212 and played in step 433; so steps 413, 415, 435 and 437 are omitted.

If it is determined in step 413 that there is not an alert condition, or if step 413 is omitted, then control passes to step 439. In step 439, it is determined whether there is a change in the in-ear earbuds (e.g., an in-ear earbud is removed or an out of ear earbud is placed in the user's ear). If so, the process continues at step 407. If not, then in step 441 it is determined whether the user is done with the device, e.g., by speaking the phrase "unit off," or "Done." If so, then the process ends. Otherwise, the process continues at step 427, described above.

Thus, the audio interface unit 160 is capable of presenting network service data as audio in one or more earbuds and responding based on user sounds spoken into a microphone. In the illustrated embodiment, the audio interface unit 160 determines, based on data received from an in-ear detector in communication with a data communications bus, whether the earbud speaker is in place in an ear of the user. If the speaker is determined not in place in the ear of the user, then the audio interface unit 160 terminates presentation of the received audio data at the speaker.

The audio interface unit 160, in some embodiments, determines whether to present the audio data by sending data indicating the spoken word to a remote service and receiving, from the remote service, data indicating whether to initiate presentation of the audio data. In some embodiments, the data indicating whether to initiate presentation of the audio data is the audio data to be presented, itself. In some embodiments, the determination whether to present the audio data further comprises converting the spoken word to text in a speech to text module of the text-audio processor and determining whether to initiate presentation of the audio data based on the text. In some embodiments, the initiation of the presentation of the received audio data at the speaker further comprises converting audio data received as text from the different apparatus to speech in a text to speech module of the text-audio processor.

In some embodiments, a memory in communication with a data communications bus includes data indicating a limited vocabulary of text for the speech to text module, wherein the limited vocabulary represents a limited set of verbal commands to which the apparatus responds. In some embodiments, the apparatus is small enough to be hidden in an article of clothing worn by the user. In some embodiments, a single button indicates a context sensitive user response to the presentation of the received audio data at the speaker.

FIG. 5 is a flowchart of an example process 500 for providing network services at a personal audio service, according to one embodiment. In one embodiment, the personal audio service 143 on the host 140 performs the process 500 and is implemented in, for instance, a chip set including a processor and a memory as shown FIG. 9 or one or more components of a general purpose computer as shown in FIG. 8, including logic encoded in tangible media.

In step 503, a logon request is received from user equipment (UE). For example an HTTP request is received from browser 109 on UE 101 based on input provided by user 190. In some embodiments, step 503 includes authenticating a user as a subscriber or registering a user as a new subscriber, as is well known in the art. In step 505, a user interface, such as a web page, is generated for the user to specify audio preferences and alert conditions to be used for an audio interface unit of the user (e.g., audio interface unit 160 of user 190). In step 507, the interface is sent to the user equipment.

Figure 6:
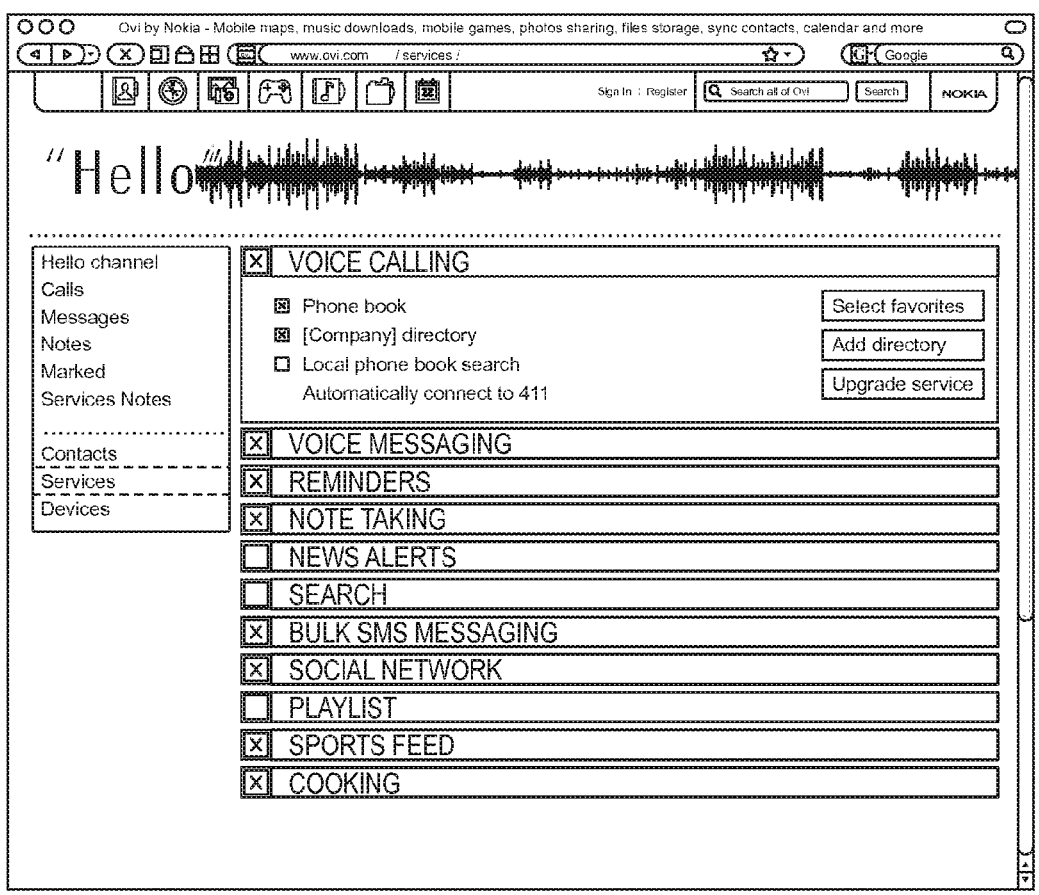
FIG. 6 is a diagram of an example user interface utilized in a portion of the process of FIG. 5, according to an embodiment.

FIG. 6 is a diagram of an example user interface 600 utilized in a portion of the process of FIG. 5, according to an embodiment. The example user interface 600 is referred to as the "Hello" page to indicate that the interface is for setting up audio sessions, alerts and responses, such as the common spoken greeting and response "Hello." In the illustrated embodiment, the Hello page 600 is sent to the browser 109 on UE 101 during step 507.

The Hello page 600 includes options for the user to select from a variety of network services that can be delivered to the user's audio interface unit 160. For example, the left panel indicates the user may select from several personal audio service options listed as "Hello channel," "Calls," "Messages," "Notes," "Marked," and "Service Notes." These options refer to actions taken entirely by the personal audio service 143 on behalf of a particular user. In addition, the user can indicate other network entities to communicate with through personal audio service 143 and the audio interface unit 160, such as "Contacts," "Services," and "Devices." These options refer to actions taken by third party entities other than the personal audio service 143 and personal audio client 161. Contacts involve others who may communicate with the user through phone calls, emails, text messages and other protocols that do not necessarily involve an audio interface unit 160. Services are provided by service providers on the internet and one or more phone networks, including a cellular telephone network. Devices involve personal area network devices with which the audio interface unit 160 could potentially communicate via the Bluetooth protocol. The user navigates the items of the Hello page to determine what services to obtain from the personal audio service 143 and how the personal audio service 143 is to interact with these other entities to deliver audio to the audio interface unit 160.

Any audio and text data may be channeled to and from the audio interface unit 160 by the personal audio service 143 and the personal audio client 161. Text provided by services is converted by the personal audio service 143 to audio (speech). In the illustrated embodiment, the third party services that can be selected to be channeled through the personal audio service 143 to the audio interface unit 160 are voice calls, voice messaging, reminders, note taking, news alerts, search engines, bulk short message service (SMS) protocol messaging, such as TWITTER™, social network services such as FACEBOOK™, playlist services such as LASTFM™, sports feed services such as ESPN GAMEPLAN™, and cooking services. In the illustrated embodiment, the user has selected some of these services by marking an associated checkbox (indicted by the x in the box to the left of the name of the third party service). When one of the third party services are highlighted, any sub-options are also presented. For example, the voice calling service includes sub-options for selecting a directory as a source of phone numbers to call.

Referring again to FIG. 5, in step 509, it is determined whether a response has been received from a user, e.g., whether an HTTP message is received indicating one or more services or sub-options have been selected. If so, then in step 511 the audio preferences and alert conditions for the user are updated based on the response. For example, in step 511 a unique identifier for the audio interface unit 160 is indicated in a user response and associated with a registered user. In step 513, it is determined if the interaction with the user is done, e.g., the user has logged off or the session has timed out.

If not, control passes back to step 505 and following to generate and send an updated interface, such as an updated web page. If a response is not received then, in step 513, it is determined if the interaction is done, e.g., the session has timed out.

The above steps are based on interactions between the personal user service 143 and a browser on a conventional device with visual display and keyboard of multiple keys, such as browser 109 on UE 101. The following steps are based on interactions between the personal user service 143 and a personal audio client 161 on an audio interface unit 160.

In step 531 it is determined whether the audio interface unit is offline. For example, if no message has been received from the unit for an extended time, indicating the unit may be powered off, then it is determined in step 531 that the audio interface unit 160 is offline. As another example, a message is received from the personal audio client 161 that the unit is offline based on the message sent in step 411, because no earbud speaker was detected in position in either of the user's ears.

If it is determined in step 513, that the audio interface unit 160 is offline, then, in step 533 it is determined whether there is an alert condition. If not, then step 531 is repeated. If so, then, in step 535, data indicating filtered alerts are stored. As described above, with reference to step 417, alerts that have no meaning when delayed are filtered out; and the filtered alerts are those that still have meaning at a later time. The filtered alerts are stored for delayed delivery. Control passes back to step 531.

If it is determined in step 531 that the audio interface unit 160 is online, then in step 515 the personal audio service 143 requests or otherwise receives data indicated by the user's audio preferences and alert conditions. For example, the personal audio service 143 sends requests that indicate phone calls for the user's cell phone or land line or both are to be forwarded to the personal audio service 143 to be processed. Similarly, the personal audio service 143 requests any Really Simple Syndication (RSS) feeds, such as an internet news feed, indicated by the user in responses received in step 509.

In step 517, one or more audio channels are constructed for the user based on the audio preferences and received data. For example, the user may have defined via responses in step 509 a first channel for music from a particular playlist in the user's profile on the social network. Similarly, the user may have defined via responses in step 509 a second channel for an RSS feed from a particular news feed, e.g., sports, with interruptions for breaking news from another news source, e.g., world politics, and interruption for regular weather updates on the half hour, and to publish this channel so that other contacts of the user on the social network can also select the same channel to be presented at their devices, including their audio interface devices. In step 517, for this example, audio streams for both audio channels are constructed.

In step 519, it is determined whether any alert conditions are satisfied, based on the alert conditions defined in one or more user responses during step 509. If so, then in step 521 the alerts are added to one or more channels depending on the channel definitions given by the user in response received in step 509. For example, if there are any stored filtered alerts from step 535 that have not yet been delivered, these alerts are added to one or more of the channels. For example, if the user has defined the first channel such that it should be interrupted in one ear only by any alerts, with a higher priority for alerts related to changes in status of contacts in a social network than to breaking news alerts and a highest priority for alerts for incoming voice calls, the stored and new alerts are presented in that order on the first channel. Similarly, the user may have defined a different priority of alerts for the second channel, and the stored and new alerts are added to the second channel with that different priority. In some embodiments, alerts are not added to a published channel delivered to another user unless the user defining the channel indicates those alerts are to be published also.

After any alerts are added, or if there are no alerts, then control passes to step 523. In step 523, the audio from the selected channel with any embedded alerts are sent to the personal audio client 161 over a wireless link to be presented in one or more earbuds in place in a user's ear. For example, the audio is encoded as data and delivered in one or more data packets to the personal audio client 161 on audio interface unit 160 of user 190. In some embodiments, the data packets with the audio data travel through wireless link 107a directly from a cell phone network, or a wide area network (WAN), or wireless local area network (WLAN). In some embodiments, the data packets with the audio data travel indirectly through personal audio agent process 145 on UE 101 and thence through wireless link 107b in a wireless personal area network (WPLAN) to personal audio client 161.

In step 525, it is determined if a user response message is received from the personal audio client 161 of user 190. If so, in step 527 an action is determined based on the response received and the action is performed. In some embodiments, the response received from the personal audio client is text converted from spoken sounds by the text-audio processor of the personal audio client. In some embodiments, the response received from the personal audio client 161 is coded audio that represents the actual sounds picked up the microphone of the audio interface unit 160 and placed in the response message and sent by the personal audio client 161.

The action determined and performed in step 527 is based on the user response in the message received. Thus, if the response indicates the user spoke the word "voicemail", then the voicemail is contacted to obtain any voice messages, which are then encoded in messages and sent to the personal audio client 161 for presentation in one or more in-ear earbuds of the user. Similarly, if the response indicates the user spoke the word "Channel Two", then this is determined in step 527 and in step 523, when next executed, the second channel is sent to the personal audio client 161 instead of the first channel.

In step 529, it is determined if the personal audio service is done with the current user, e.g., the user has gone offline by turning off the audio interface unit 160 or removing all earbuds. If not, control passes back to step 515 and following steps to request and receive the data indicated by the user.

Figure 10:
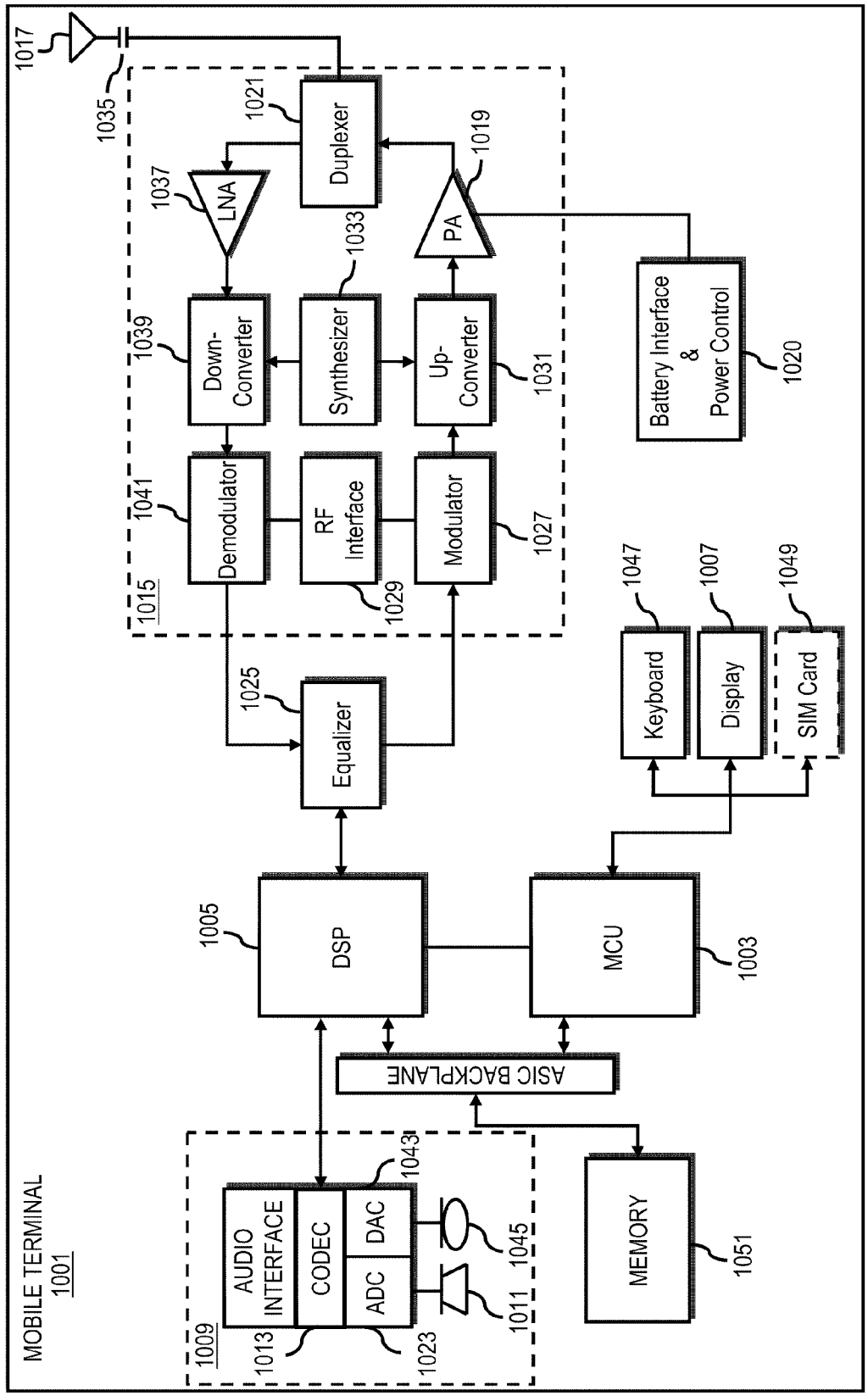
FIG. 10 is a diagram of a mobile terminal (e.g., handset) that can be used to implement an embodiment of the invention.

FIG. 7 is a flowchart of an example process 700 for providing network services at a personal audio agent in communication between a personal audio service 143 and an audio interface unit 160, according to one embodiment. In one embodiment, the personal audio agent process 145 on UE 101 performs the process 700 and is implemented in, for instance, a chip set including a processor and a memory as shown FIG. 9 or one or more components of a general purpose computer as shown in FIG. 8, such as logic encoded in tangible media, or in a mobile terminal as shown in FIG. 10.

In step 703, the audio interface units in range over wireless link 107b are determined. In the illustrated embodiment, it is determined that the audio interface unit 160 is in range over wireless link 107b. In step 705, a connection is established with the personal audio client 161 on the audio interface unit 160 in range.

In step 707, it is determined whether a message is received for a personal audio service (e.g., service 143) from a personal audio client (e.g., client 161). If so then in step 709 the message is forwarded to the personal audio service (e.g., service 143).

In step 711, it is determined whether a phone call is received for a user of the audio interface unit in range. For example, if the user has not indicated to the personal audio service 143 to direct all phone calls to the service, and the audio interface unit does not have a full cellular engine, then it is possible that the user receives a cellular telephone call on UE 101. That call is recognized by the personal audio agent in step 711.

If such a call is received, then in step 713, a phone call alert is forwarded to the personal audio client on the audio interface unit to be presented in one or more in-ear earbuds. In some embodiments, in which the audio interface unit includes a full cellular engine, or in which all calls are forwarded to the personal audio service 143, step 711 and step 713 are omitted.

In step 715 it is determined whether audio data for an audio channel is received in one or more data packets from a personal audio service (e.g., service 143) for a personal audio client (e.g., client 161) on an in-range audio interface unit. If so, then in step 717 the audio channel data is forwarded to the personal audio client (e.g., client 161).

In step 719, it is determined whether the process is done, e.g., by the audio interface unit (e.g., unit 160) moving out of range, or by receiving an end of session message from the personal audio service (e.g., service 143), or by receiving an offline message from the personal audio client (e.g., client 161). If so, then the process ends. If not, then step 707 and following steps are repeated.

The processes described herein for providing network services at an audio interface unit may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 8 illustrates a computer system 800 upon which an embodiment of the invention may be implemented. Computer system 800 is programmed (e.g., via computer program code or instructions) to provide network services through an audio interface unit as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing network services through an audio interface unit.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing network services through an audio interface unit The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for at least some steps for providing network services through an audio interface unit. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for at least some steps for providing network services through an audio interface unit is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing network services directly to an audio interface unit 160 or indirectly through the UE 101.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server host 892 connected to the Internet hosts a process that provides a service in response to information received over the Internet. For example, server host 892 hosts a process that provides information representing video data for presentation at display 814.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set 900 upon which an embodiment of the invention may be implemented. Chip set 900 is programmed to provide network services through an audio interface unit as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of providing network services through an audio interface unit.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform one or more of the inventive steps described herein to provide network services through an audio interface unit The memory 905 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of providing network services through an audio interface unit Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a base-band integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to support providing network services through an audio interface unit The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising:
    a data communications bus; and
    logic encoded in one or more tangible media configured to:
        determine, based on spoken sounds of a user of the apparatus received at a microphone in communication with the tangible media through the data communications bus, whether to present at a speaker audio data received from a different apparatus, wherein the received audio data includes one or more alerts;
        if it is determined to present the received audio data, then initiate presentation of the received audio data at the speaker in communication with the tangible media through the data communications bus;
        determine, based on data received from an in-ear detector in communication with the data communications bus, whether the speaker is in place in an ear of the user; and
        if the speaker is determined not in place in the ear of the user, then terminate presentation of the received audio data at the speaker, filter the received audio data for later presentation, and store the filtered audio data.

2. An apparatus as in claim 1, wherein the apparatus does not include a visual display and does not include a plurality of buttons.

3. An apparatus as in claim 1, further comprising a memory in communication with the data communications bus and including computer instructions, the memory and the computer instructions configured to, with the logic, cause the apparatus to at least determine whether to present the audio data and, if it is determined to present the audio data, then to initiate the presentation of the received audio data.

4. An apparatus as in claim 1, wherein the microphone is configured to be worn by the user of the apparatus, the apparatus further comprising:
    a wireless transceiver for receiving over a wireless communication link the audio data from the different apparatus;
    the speaker being configured to be worn in the ear of the user; and
    the in-ear detector being configured to determine when the speaker is disposed in the ear of the user.

5. An apparatus as in claim 4, wherein the wireless transceiver is at least one of:
    a cellular telephone transceiver;
    a wireless network interface following the IEEE 802.11 standard for wireless local area network (WLAN); and
    a wireless network interface following the IEEE 802.15 standard wireless personal area network (WPAN).

6. An apparatus as in claim 4, wherein the determination whether to present the audio data further comprises sending data indicating the spoken sounds to a remote service and receiving, from the remote service, data indicating whether to initiate presentation of the audio data, and
wherein the one or more alerts include one or more calls, one or more text and voice messages, one or more user-set alarms, one or more appointment reminders, or a combination thereof.

7. An apparatus as in claim 6, wherein the data indicating whether to initiate presentation of the audio data is the audio data to be presented.

8. An apparatus as in claim 1, wherein,
the tangible media is further configured as a speech to text module; and
the determination whether to present the audio data further comprises converting the spoken sounds to text in the speech to text module and determining whether to initiate presentation of the audio data based on the text.

9. An apparatus as in claim 8, further comprising a memory in communication with the data communications bus and including data indicating a limited vocabulary of text for the speech to text module, wherein the limited vocabulary represents a limited set of verbal commands to which the apparatus responds.

10. An apparatus as in claim 1, wherein:
the tangible media is further configured as a text to speech module; and
the initiation of the presentation of the received audio data at the speaker further comprises converting audio data received as text from the different apparatus to speech in the text to speech module.

11. An apparatus as in claim 1, wherein the apparatus is small enough to be hidden in an article of clothing worn by the user.

12. An apparatus as in claim 1, further comprising a single button to indicate a context sensitive user response to the presentation of the received audio data at the speaker.

13. A method comprising:
determining, by an apparatus, based on spoken sounds of a user of the apparatus received at a microphone of the apparatus, whether to present at a speaker associated with the apparatus audio data received from a different apparatus, wherein the received audio data includes one or more alerts;
if it is determined to present the received audio data, then initiating, by the apparatus, presentation of the received audio data at the speaker
determining, based on data received from an in-ear detector in communication with the apparatus, whether the speaker is in place in an ear of the user; and
if the speaker is determined not in place in the ear of the user, then terminating presentation of the received audio data at the speaker, filtering the received audio data for later presentation, and storing the filtered audio data.

14. A method as in claim 13, wherein the determination whether to present the audio data further comprises sending data indicating the spoken sounds to a remote service and receiving, from the remote service, data indicating whether to initiate presentation of the audio data, and the one or more alerts include one or more breaking news alerts, one or more social network status changes, or a combination thereof.

15. A method as in claim 13, wherein the received audio data is filtered based upon relevancy to a filtering time point, a time point of the later presentation, or a combination thereof.

16. A method as in claim 13, further comprising:
causing, at least in part, presentation of a user query to specify one or more audio preferences, one or more alert conditions, or a combination thereof,
wherein one or more audio preferences include parameters with respect to how to mix different simultaneous audio sources, which earbud to use for alerts when one or more earbuds are available, how to respond when the one or more earbuds are not in an ear, what words to use for different apparatus actions, what words to use in different alert contexts, what network addresses to use for one or more audio services, names for different audio sources, names for different contacts, or a combination thereof.

17. A non-transitory computer-readable storage medium carrying one or more sequences of one or more instructions which, when executed by one or more processors, cause an apparatus to perform at least the following:
determining, based on spoken sounds of a user of an apparatus received at a microphone of the apparatus, whether to present at a speaker of the apparatus audio data received from a different apparatus, wherein the received audio data includes one or more alerts;
if it is determined to present the received audio data, then initiating presentation of the received audio data at the speaker;
determining, based on data received from an in-ear detector in communication with the apparatus, whether the speaker is in place in an ear of the user; and
if the speaker is determined not in place in the ear of the user, then terminating presentation of the received audio data at the speaker, filtering the received audio data for later presentation, and storing the filtered audio data.

* * * * *